US006021410A

United States Patent [19]

Choy

[11] Patent Number: 6,021,410
[45] Date of Patent: Feb. 1, 2000

[54] EXTENSIBLE DIGITAL LIBRARY

[75] Inventor: David Mun-Hien Choy, Los Altos, Calif.

[73] Assignee: International Business Machines Corporation, Armonk, N.Y.

[21] Appl. No.: 08/936,172

[22] Filed: Sep. 25, 1997

[51] Int. Cl.[7] .................................................. G06F 17/00
[52] U.S. Cl. ......................... 707/103; 707/102; 707/203; 707/10
[58] Field of Search ........................................ 707/1–206

[56] References Cited

U.S. PATENT DOCUMENTS

| | | |
|---|---|---|
| 5,058,000 | 10/1991 | Cox et al. . |
| 5,097,533 | 3/1992 | Burger et al. . |
| 5,115,501 | 5/1992 | Kerr . |
| 5,129,086 | 7/1992 | Coyle, Jr. et al. . |
| 5,182,705 | 1/1993 | Barr et al. . |
| 5,216,592 | 6/1993 | Mann et al. . |
| 5,265,252 | 11/1993 | Rawson, III et al. . |
| 5,278,978 | 1/1994 | Demers et al. . |
| 5,301,320 | 4/1994 | McAtee et al. . |
| 5,319,543 | 6/1994 | Wilhelm . |
| 5,327,529 | 7/1994 | Fults et al. . |
| 5,408,652 | 4/1995 | Hayashi et al . |
| 5,414,843 | 5/1995 | Nakamura et al. . |
| 5,414,847 | 5/1995 | Tsukakoshi . |
| 5,455,948 | 10/1995 | Poole et al. . |
| 5,535,332 | 7/1996 | Ishida . |
| 5,535,389 | 7/1996 | Elder et al. . |
| 5,548,506 | 8/1996 | Srinivasan . |
| 5,581,691 | 12/1996 | Hsu et al. . |
| 5,630,069 | 5/1997 | Flores et al. . |
| 5,701,461 | 12/1997 | Dalal et al. ............................. 395/604 |
| 5,787,413 | 7/1998 | Kauffman et al. .......................... 707/2 |
| 5,802,524 | 9/1998 | Flowers et al. ......................... 707/103 |
| 5,809,145 | 9/1998 | Silk et al. .................................. 380/25 |
| 5,812,668 | 9/1998 | Weber ....................................... 380/24 |

FOREIGN PATENT DOCUMENTS

| | | |
|---|---|---|
| 0 624 964 A1 | 11/1994 | European Pat. Off. . |
| 0 682 318 A1 | 11/1995 | European Pat. Off. . |

OTHER PUBLICATIONS

R. Agrawal, et al., Mining Sequential Patterns, IBM Almaden Research Center, pp. 1–12, Mar. 1995.

R. Srikant, et al., Mining Sequential Patterns: Generalization and Performance Improvements, IBM Almaden Research Center, pp. 1–15, Mar. 1996.

IBM ImagePlus VisualInfo Information and Planning Guide, 1994 and 1995.

IBM ImagePlus VisualInfo Application Programming Reference, vol. 1, pp. 1–46, 1993–1995.

(List continued on next page.)

*Primary Examiner*—Wayne Amsbury
*Assistant Examiner*—David Yiuk Jung
*Attorney, Agent, or Firm*—Merchant & Gould P.C.

[57] ABSTRACT

An extensible digital library is comprised of a library server and an object server. The library server stores tables describing the digital library, wherein it uses a relational database server to manage the storage of the tables describing the digital library. The object server stores objects referenced by the tables describing the digital library. Two application programming interfaces (APIs) are provided. A first API is coupled to the library server and the object server and provides functions for accessing the stored tables and the stored objects via the library server and the object server. A second API is coupled to the first API and the relational database server and provides functions for accessing the stored tables via the relational database server.

10 Claims, 1 Drawing Sheet

OTHER PUBLICATIONS

ERwin/Navigator User's Guide, pp. 1–7, 1996.

IBM Digital Library, Application Programming Guide for AIX and IRIX, Version 1, Document No. SC26–8654–00, pp. 1–134, 1996.

IBM Digital Library, Integrating Multimedia Server for AIX, Version 1, Document No. GC26–8872–01, pp. 1–23, 1996.

IBM Database 2, SQL Reference For Common Servers, Version 2, pp. 25–75, 1994–1995.

I. Kojima et al., Implementation Of An Object–Oriented Query Language System . . . Interface, IEEE, pp. 79–86, 1991.

A. Dogac et al., A Multidatabase System Implementation On CORBA, IEEE, pp. 2–11, 1996.

J.T. Anderson et al., Generic Database Interface (GDI) User Manual, Special Technical Report, Feb. 25, 1994.

D. Hollingsworth, Workflow Management Coalition—The Workflow Reference Model, Document No. TC00–1003, pp. 1–44, Nov. 28, 1994.

A.L. Scherr, A New Approach To Business Processes, IBM Systems Journal, vol. 32, No. 1, pp. 80–98, 1993.

C. Mohan, et al., Exotica: A Research Perspective On Workflow Management Systems, Data Engineering, vol. 18, No. 1, pp. 1–6, Mar. 1995.

A.V. Aho, The Transitive Reduction Of A Directed Graph, SIAM J. Comput, vol. 1, No. 2, pp. 131–137, Jun. 1972.

F. Leyman, et al., Managing Business Processes As An Information Resource, IBM Systems Journal, vol. 33, No. 2, pp. 326–348, 1994.

The NFS™ Distributed File Service, NFS White Paper, Mar. 1995.

EXTENSIBLE DIGITAL LIBRARY

BACKGROUND OF INVENTION

1. Field of the Invention

This invention relates to an improved method of handling and accessing library and non-library information through a novel use of application programming interfaces (APIs).

2. Description of Related Art

A digital library system typically handles a large amount of both structured information (e.g., bibliographic data, catalog data, structured documents, business data) and unstructured information (e.g., image, text, audio, video). Each form of data is usually managed by a separate, specialized resource manager. For example, a database management system (DBMS), such as DB2 (TM), may be used to manage structured data; an object repository system, such as ADSM (TM), may be used to manage image and text; and a stream-data server, such as TigerShark (TM), may be used to manage audio and video.

To manage these data properly for a digital library, a customized data model is frequently required, involving application-specific tables, attributes, structures, relationships, constraints, semantics, and optimization. In many cases, a digital library is an extension of a customer's existing database and production applications. In other cases, it is a component of the customer's overall information technology vision. Thus, the data management requirements can be much broader than those of the digital library alone. For these reasons, the data model requirements are often different even between two similar digital libraries within the same industry.

In the publishing industry, for example, a publisher typically designs its own proprietary database to maintain its bibliography and content data for producing new electronic products. There are also reported cases that different organizations within a large enterprise require different metadata on the same data. Therefore, it is not possible to pre-design a fixed model of a database that can support all digital library applications, except for the case where a relatively simple and generic model is sufficient, for instance, the VisualInfo (TM) product sold by IBM Corporation, the assignee of the present invention.

A digital library or content management system usually supports a high-level content model, such as document, folder, and card-catalog. This high-level model is usually built on top of a relational database management system (RDBMS). To access library content, an application such as VisualInfo(TM) typically uses a system-provided API. This assures that the integrity of the system and of the content model are not compromised. It also controls accesses to the system to assure only authorized accesses are allowed.

This design is logical. However, when such a system is used to support diverse applications, the system-provided content model is frequently insufficient and often even unsuitable. Unfortunately, no "universal" model has been found for digital libraries. Building another digital library model on top of an existing model can be difficult and the performance penalty is unacceptable.

In fact, even without modeling problems, many high-volume applications need faster access to content. On the other hand, an application often needs to integrate the digital library with a production database. Accessing content through a high-level API does not allow true integration at the database level, which, for example, allows direct joining of library tables with production tables, thereby significantly simplifying query and improving performance.

SUMMARY OF INVENTION

To overcome the problems described above, and to overcome other problems in the art, the present invention discloses a method, apparatus, and article of manufacture for extending a digital library. The extensible digital library is comprised of a library server and an object server. The library server stores tables describing the digital library, wherein it uses a relational database server to manage the storage of the tables describing the digital library. The object server stores objects referenced by the tables describing the digital library. Two integrated application programming interfaces (APIs) are provided. A first API is coupled to the library server and the object server and provides functions for accessing the stored tables and the stored objects via the library server and the object server. The second API is coupled to the first API and the relational database server and provides functions for accessing the stored tables via the relational database server.

The invention seeks to minimize the problems of the prior art, and provide advantages of existing digital library systems for accessing and handling data According to the invention there is provided an augmentation of the first (digital library) API with the second (SQL) API to provide a direct access to the relational database without going through the library server and object server. Such access is handled by the relational database server without any interaction by the library server or the object server.

Direct access allows an application to fully exploit the capabilities of the relational database server, and thus is able to leverage technology advances in relational database servers. Contrarily, a conventional digital library usually "freezes" the relational database technology used therein.

DETAILED DESCRIPTION OF THE INVENTION

Figure 1:
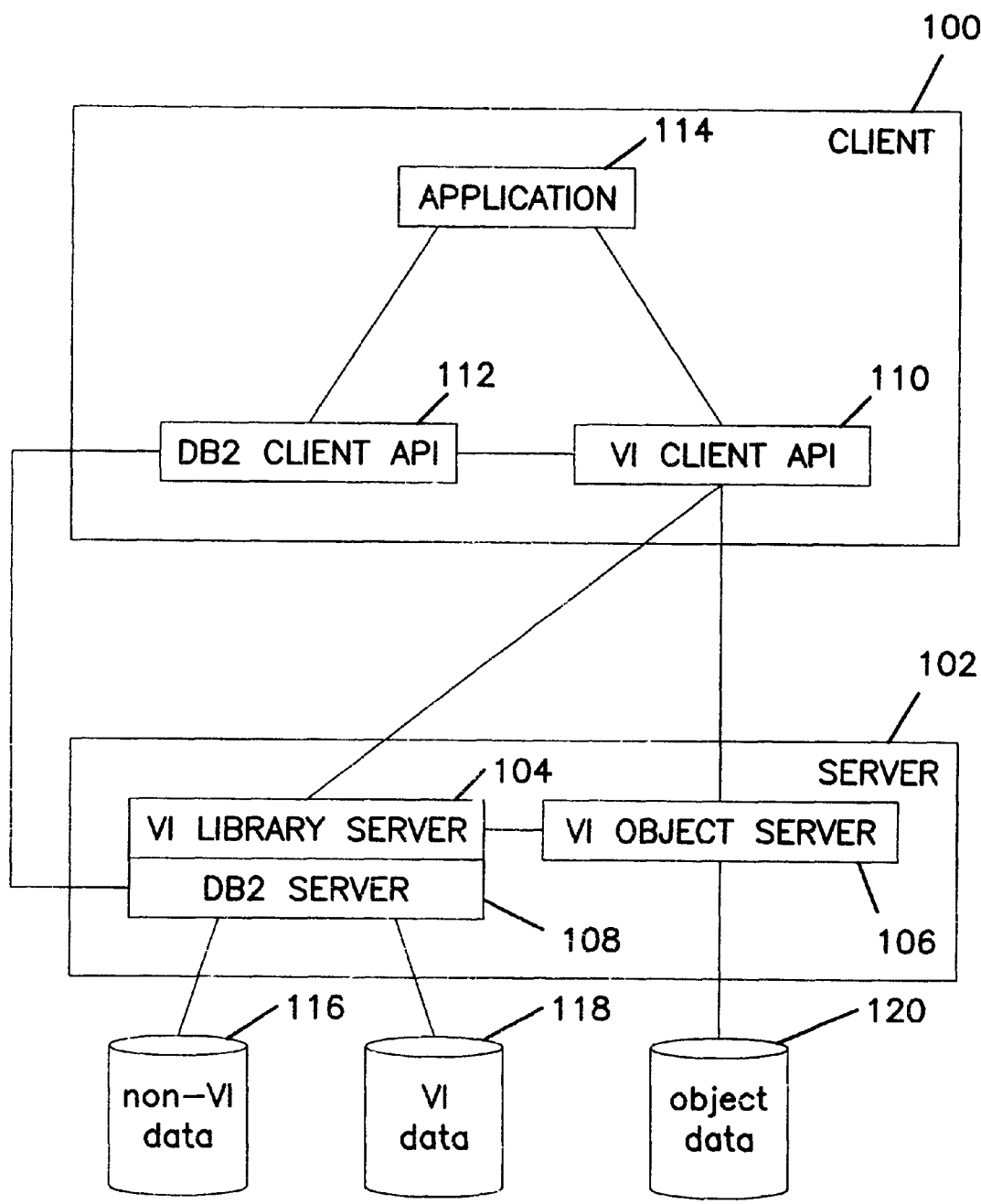
FIG. 1 is an exemplary hardware and software environment used to implement the preferred embodiment of the invention, and illustrates the main characteristics of the system.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware and Software Environment

FIG. 1 is a block diagram that illustrates an exemplary hardware and software environment used to implement the preferred embodiment of the invention. The present invention comprises a VisualInfo (TM) digital library system that is typically implemented using a client computer 100 coupled to a server computer 102, although it could be implemented on a single computer. Both the client 100 and server 102 generally include, inter alia, one or more processors, random access memory (RAM), data storage devices, data communications devices, and other peripherals. Those skilled in the art will recognize that any combination of the above components, or any number of different components, peripherals, and other devices, may be used with either the client 100 or server 102.

The present invention is generally implemented using inter-related computer programs executed by both the client 100 and server 102. These computer programs include a VI (VisualInfo) Library Server 104 and VI Object Server 106, wherein the VI Library Server 104 is built upon a DB2 Server 108. These servers 104, 106, and 108 communicate directly or indirectly with a VI Client API 110 and a DB2 Client API 112. The VI Client API 110 and DB2 Client API 112, in turn, communicate directly or indirectly with an Application 114. More information concerning each of the above-identified components is provided below.

All of the computer programs are comprised of instructions which, when read and executed by a computer, causes the computer to perform the steps necessary to implement and/or use the present invention. Generally, the computer programs are tangibly embodied in and/or are readable from a device, carrier, or media, such as memory, data storage devices, and/or remote devices coupled to the computer via data communications devices. Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass computer programs accessible from any computer-readable device, carrier, or media. Of course, those skilled in the art will recognize many modifications may be made to this configuration without departing from the scope of the present invention.

Those skilled in the art will also recognize that the exemplary environment illustrated in FIG. 1 is not intended to limit the present invention. Further, those skilled in the art will recognize that other alternative hardware and software environments may be used without departing from the scope of the present invention.

Application

In the preferred embodiment of the extensible digital library, the Application 114 provides the end-user interface for the functionality performed by the other components of the digital library system. Thus, the Application 114 provides a mechanism for managing catalogs, folders, documents, objects, and other elements of the digital library system.

In the data model provided by the digital library system, the most basic components are documents, folders, workbaskets, and workflows. Documents are similar to paper documents. Folders are similar to folders in a paper filing system and can contain other folders or documents. A workflow is a series of workbaskets or queues that contain documents and folders to be processed. Depending on end-user's level of access to these elements, the following operations, using the Application 114, can be performed: storing a document, indexing a document or folder, processing a document or folder, retrieving a document or folder, deleting a document or folder, processing workflows and workbaskets, etc.

Generally, an end-user can write their own Application 114 or use a pre-defined Application 114. Moreover, it is anticipated that a pre-defined Application 114 can be configured or customized via user exits and other techniques.

In the context of the present invention, the Application 114 could also comprise a System Administration Program that permits configuring of the VisualInfo (TM) digital library system. Such a System Administration Program could configure both hardware and software resources in the system, control the level of access that end-users have to the system, and provide other administrative functions.

VI Client API

The VI Client API 110 provides the functions necessary for the Application 114 to interact with the VI Library Server 104 and the VI Object Server 106. Using the VI Client API 110, the Application 114 can command the VI Library Server 104 and VI Object Server 106 to perform digital library functions, including storing a document, indexing a document or folder, processing a document or folder, retrieving a document or folder, deleting a document or folder, processing workflows and workbaskets, etc.

DB2 Client API

The DB2 Client API 112 is integrated with the VI Client API 110 and provides the functions necessary for the Application 114 to interact directly with the DB2 Server 108, thereby bypassing the VI Library Server 104 and the VI Object Server 106. Using the DB2 Client API 112, the Application 114 can directly invoke any functions of the DB2 Server 108, including both built-in functions, user-defined functions, extended functions, etc. Further, the Application 114 can invoke Structured Query Language (SQL) statements or stored procedures in the DB2 Server 108 using the DB2 Client API 112.

Generally, the DB2 Client API 112 is used directly if the Application 114 is fairly sophisticated, understands the underlying data structure of the digital library, and thus can access the data structures of the digital library directly. Alternatively, the DB2 Server API 112 is used directly to access data structure external to the digital library. Of course, any Application 114 can use both the DB2 Client API 112 and the VI Client API 110 in tandem.

VI Library Server

The VI Library Server 104 maintains the contents of the digital library and provides data integrity by performing the following functions: managing the data structures of the digital library; maintaining index information; and controlling access to document objects stored in the VI Object Server 106. As illustrated, the VI Library Server 104 is built upon relational database management system (RDBMS) technology, such as the DB2 Server 108. As a result, the DB2 Server 108 is capable of accessing both non-VI data 116 and VI data 118, as required.

VI Object Server

Each VI Object Server 106 is associated with a VI Library Server 104 and maintains object data 120 (usually document objects) that are referenced by the tables comprising the VI data 118. This combination of VI data 118 and object data 120 generally comprises a "digital library." The VI Object Server 106 receives requests from the Application 114 via the VI Library Server 104 and then communicates the results from those requests to the Application 114 via the VI Client API 110.

Operation of the System

The DB2 Client API 112 is integrated with the VI Client API 110, and may be used separately or in combination therewith. The DB2 Client API 112 is used primarily for interfacing the Application 114 directly with the DB2 Server 108, in order to exploit the capabilities of the DB2 server 108 when accessing non-VI data 116 or VI data 118 managed by the DB2 Server 108. Such access should not comprising the integrity of the VI data 118 or the object data 120, or violate any access control mechanisms specified for the digital library. As a result, the DB2 Client API 112 and DB2 Server 108 are intended to augment, rather than replace, the set of functions provided by the VI Client API 110, VI Library Server 104, and VI Object Server 106.

Generally, however, VI data 118 cannot be altered by means of the DB2 Client API 112 and DB2 Server 108. Further, in most instances only an authorized subset of VI data 118 can be accessed by means of the DB2 Client API 112 and DB2 Server 108. It is intended that, in most instances, the DB2 Client API 112 does not violate any structures or authorizations of the system. The objective of the present invention is to add SQL functions to the functions normally available via the VI Client API 110, not to replace the VI Client API 110. Hence, there is no need to perfectly mimic accessibility to the VI data 118. A conservative approach, i.e., less than full access, is preferred. Obviously, a database administrator can increase/decrease accessibility as needed.

For example, the Application 114 may concurrently access both non-VI data 116 and VI data 118 using the DB2 Client API 112 and the DB2 Server 108, e.g., to join a non-VI table with a VI table, provided that the Application 114 is authorized to access both tables. In another example, the DB2 Client API 112 and DB2 Server 108 could use non-VI tables to reference VI tables, wherein "Foreign Keys" are specified to maintain referential integrity (which requires a REFERENCE privilege on the VI table). In such instances, the DB2 Server 108 also needs to handle the appropriate error codes when a Application 114 attempts to delete a referenced entity (e.g., a DB2 delete rule violation).

Which non-VI data 116 and VI data 118 is accessible via the DB2 Client API 112 depends on administrative settings within the DB2 Server 108, non-VI data 116, and VI data 118. In certain instances, the DB2 Client API 112 may be used to access all of the non-VI data 116 and VI data 118 managed by the DB2 Server 108. Alternatively, the DB2 Client API 112 may be restricted to accessing just non-VI data 118, so that access to VI data can only occur through the VI Client API 110. In addition, the DB2 Client API 112 may be restricted to accessing a subset of the non-VI data 116 and/or VI data 118.

Similarly, which DB2 Server 108 functions are available to the Application 114 via the DB2 Client API 112 depends on administrative settings within the DB2 Server 108, non-VI data 116, and VI data 118. In certain instances, the DB2 Client API 112 may be able to provide access to all of the functions of the DB2 Server 108. Alternatively, the DB2 Client API 112 may be restricted to providing access to just a subset of the available functions of the DB2 Server 108, e.g., only read-only functions or SELECT statements.

To enhance usability, database views with user-defined names can be created for access through the DB2 Client API 110 and DB2 Server 108. Database access authorization also can be granted to end-users explicitly and individually by the DB2 Server 108 in conjunction with its own access control authorization. This includes the creation of corresponding users and user groups.

Additional databases outside the digital library system could also be accessible via the DB2 Client API 112. Such "external" database are often administered separately by other DB2 Servers 108 (or other RDBMS servers), including the administration of access control. These additional databases could comprise an enterprise's production database, or a database designed as an extension to the VisualInfo (TM) digital library, or a database supporting a custom content model. Any content model or database can be supported in this manner.

In summary, the DB2 Client API 112 essentially provides a "fast path" between the Application 114 and the DB2 Server 108 to access non-VI data 116 and/or VI data 118. In addition, the DB2 Client API 112 provides access to other functionality of the DB2 Server 108, such as SQL statements. However, it does not necessarily provide all the functions available when using the VI Client API 110, VI Library Server 104, and VI Object Server 106.

Conclusion

The present invention describes an extensible digital library comprised of a library server and an object server. The library server stores tables describing the digital library, wherein it uses a relational database server to manage the storage of the tables describing the digital library. The object server stores objects referenced by the tables describing the digital library. Two application programming interfaces (APIs) are provided. One API is coupled to the library server and the object server and provides functions for accessing the stored tables and the stored objects via the library server and the object server. The other API is coupled to the relational database server and provides functions for accessing the stored tables via the relational database server.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description but rather by the claims appended hereto.

What is claimed is:

1. An extensible digital library, comprising:
   (a) a library server for storing tables describing the digital library, wherein the library server further includes a relational database server for managing the storage of the tables describing the digital library;
   (b) an object server, coupled to the library server, for storing objects referenced by the tables describing the digital library;
   (c) a first application programming interface (API), coupled to the library server and the object server, for providing functions for accessing the stored tables and the stored objects via the library server and the object server; and
   (d) a second application programming interface (API), coupled to the first application programming interface and the relational database server, for providing functions for interacting directly with the relational database server to access the stored tables.

2. The extensible digital library of claim 1 above, wherein the first API is independent of the second API.

3. The extensible digital library of claim 1 above, wherein the first API is used in combination with the second API.

4. The extensible digital library of claim 1 above, wherein the second API comprises a structured query language (SQL) API.

5. The extensible digital library of claim 1 above, wherein the second API accesses the stored tables via the relational database server without invoking either the library server or the object server.

6. The extensible digital library of claim 1 above, wherein the second API accesses a subset of the tables.

7. The extensible digital library of claim 1 above, wherein the second API accesses an external database.

8. The extensible digital library of claim 7 above, further comprising an application, coupled to the first and second APIs, for concurrently accessing the stored tables, stored objects, and the external database.

9. A method for storing and accessing an extensible digital library, comprising the steps of:
   (a) storing tables describing the digital library on a library server, further comprising the step of managing the storage of the tables describing the digital library using a relational database server;
   (b) storing objects referenced by the tables describing the digital library in an object server coupled to the library server;
   (c) providing functions for accessing the stored tables and the stored objects via the library server and the object server in a first application programming interface (API) coupled to the library server and the object server; and
   (d) providing functions in a second application programming interface (API) coupled to the first application programming interface and the relational database server for interacting directly with the relational database server to access the stored tables.

10. An article of manufacture comprising one or more computer program products tangibly embodying one or more computer programs that when read by one or more computers causes the computers to perform a method for storing and accessing an extensible digital library, the method comprising the steps of:
   (a) storing tables describing the digital library on a library server, further comprising the step of managing the storage of the tables describing the digital library using a relational database server;
   (b) storing objects referenced by the tables describing the digital library in an object server coupled to the library server;
   (c) providing functions for accessing the stored tables and the stored objects via the library server and the object server in a first application programming interface (API) coupled to the library server and the object server; and
   (d) providing functions in a second application programming interface (API) coupled to the first application programming interface and the relational database server for interacting directly with the relational database server to access the stored tables.

* * * * *